(No Model.)
J. S. BALDWIN.
UTILIZING WASTE HEAT OF CLAY BURNING KILNS.
No. 441,816. Patented Dec. 2, 1890.
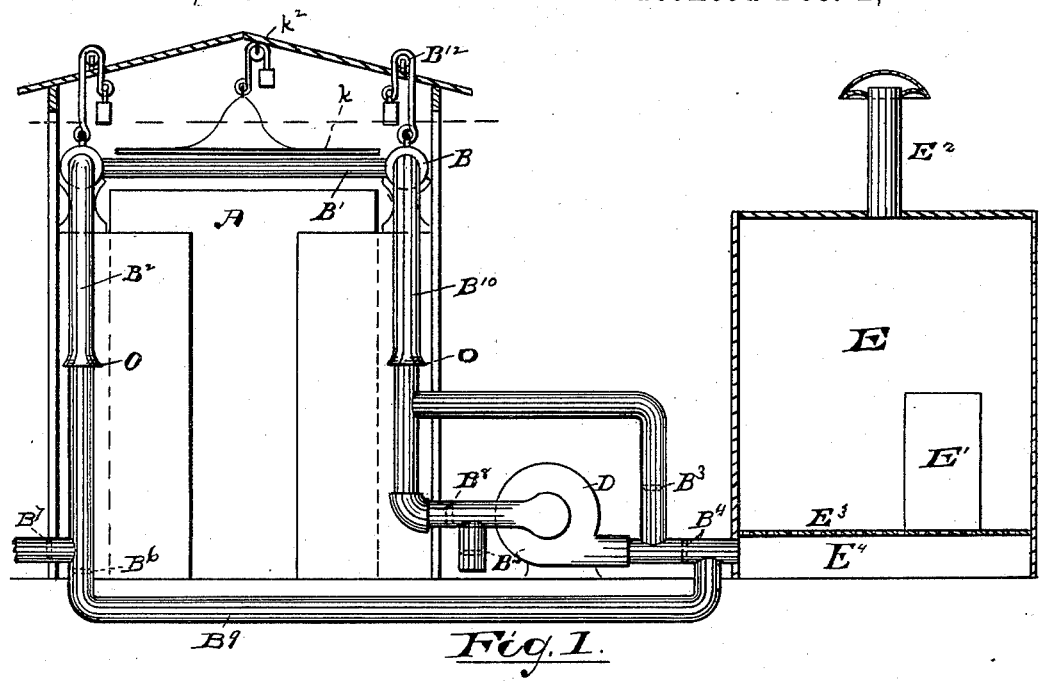
Fig. 1.
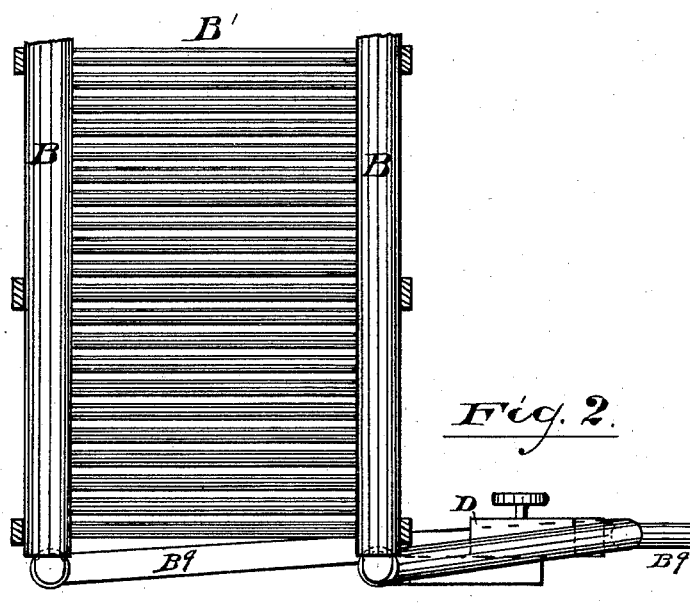
Fig. 2.
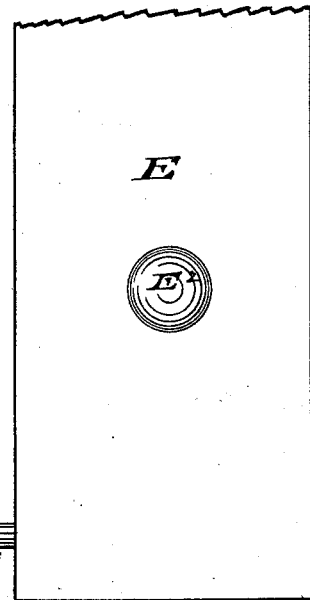
WITNESSES: Oscar A. Michel, Philip G. Voegtlen
INVENTOR: James S. Baldwin.
BY Draxe & Co ATT'YS.

UNITED STATES PATENT OFFICE.

JAMES S. BALDWIN, OF NEWARK, NEW JERSEY.

UTILIZING WASTE HEAT OF CLAY-BURNING KILNS.

SPECIFICATION forming part of Letters Patent No. 441,816, dated December 2, 1890.

Application filed January 19, 1888. Renewed May 8, 1890. Serial No. 351,032. (No model.)

*To all whom it may concern:*

Be it known that I, JAMES S. BALDWIN, a citizen of the United States, residing at Newark, in the county of Essex and State of New Jersey, have invented certain new and useful Improvements in Methods of and Means for Utilizing the Waste Heat of Clay-Burning Kilns; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

In said drawings, Figure 1, Sheet 1, shows in end elevation and partial section an open-top brick-kiln covered with the usual open shed, and provided with a metallic conduit, an exhaust-fan, a drying-house, and connecting-flues provided with suitable dampers; and Fig. 2 shows a partial plan of the same.

The waste heat of a brick-kiln or kiln employed in burning other articles formed of clay is chiefly contained in the gases which are given off during the process of burning said articles, and at a subsequent stage of that operation, after the firing is over, in the air which passes through the hot mass and receives its heat and then passes off at a high temperature. This air is comparatively pure, and may be applied to any purpose for which it is adapted; but the gases which escape during the firing process are very impure, and have a more limited range of application. I propose, while providing for the direct use of the waste hot gases, where such use is desirable, to also secure, as occasion requires, the transfer by suitable means and appliances of heat from said gases to a secondary and distinct body of comparatively pure cold air, which can be conveyed to any part of the works and used for warming apartments, for drying objects which are to be burned, and for any other purpose for which a current of warm air is applicable.

The object of my invention is to utilize the waste heat of a kiln used for burning objects made of clay in a more complete and convenient manner, and to a greater degree than has hitherto been attained; and it consists in the combination of certain devices and mechanism, substantially as will be hereinafter set forth, and finally pointed out in the clauses of the claim.

My general plan of operating the invention consists in impelling a current of air through a metallic conduit, or preferably through a series of metallic conduits, so arranged that the waste hot gases of the kiln shall impart their heat to the walls of said conduit, and thence to the air contained therein, which air, being separate from the impure gases of the kiln, will nevertheless receive their heat, and may by suitable means be applied for many useful purposes.

In this specification, and especially in the claims, except where specific distinction is made in a particular case, I use the terms "waste gases" or "waste hot gases" as broadly designating any aeriform body discharged from a clay-burning kiln during the operation of burning, or the subsequent cooling of the bricks or other objects previously heated in said kiln.

A, Fig. 1, represents a mass of hot bricks in an open-top kiln, from which the gases are escaping.

B B are headers of sheet metal, connected by tubes B' B' of the same material, arranged and adapted to be placed in any desired degree of proximity to the surface of the hot bricks, and so connected with the two headers that air may be forced into or drawn from either of said headers, causing in either case a circulation in said connecting-tubes B' B' of said air for the purpose of heating the same. The headers B may be supported by cradles, as shown, but are also counterbalanced by suitable weights and wire ropes running over the pulleys $B^{12}$. The connecting-pipes $B^2 B^{10}$ of the headers B are provided with telescopic or slip joints O O, thus permitting the easy raising and lowering of the system of pipes to any desired degree of proximity to the bricks, giving easy access thereto when required, and also affording an easy method of regulating the temperature of the conduit.

$B^3$, $B^4$, $B^5$, $B^6$, $B^7$, and $B^8$ are dampers, arranged, when properly set, to cause a current of air, impelled by the blower or exhaust-fan D, to circulate through the tubes B', either by exhaustion or pressure.

E is a drying-room, E' the door of the same, and E² an outlet by which air or gases escape from said drying-room after said air or gas has done its work.

$k$, Fig. 1, are deflecting-plates suitably counterbalanced and adapted to receive any desired adjustment, said plates having for their object the direction of the currents of escaping hot gases toward the metallic conduits B'. It will be observed that the metallic conduits and the deflecting-plates, which aid in directing the hot gases toward said conduit, are adapted to be easily moved out of the way when access to the bricks is required, or when it is desired to regulate the temperature of the currents of air heated by said conduit.

The fan or exhauster D, Fig. 1, being in motion and the dampers $B^4$ $B^7$ $B^8$ open and $B^3$ $B^5$ $B^6$ closed, then air will be drawn in $B^7$ up through $B^2$ to B, thence down through B' across the top of the kiln, where said air will be heated, thence through $B^{10}$, through $B^8$ and into the exhauster D. It will then be forced through $B^4$ to the space $E^4$ of the drying-room E, thence through and among the objects placed on the perforated floor thereof, or upon trucks, racks, or cars contained therein, and will finally be discharged through the outlet $B^2$; or, should such a course be desirable, the said air may be discharged through outlets placed in any other part of said drying-room. Should it be desired to transmit the air through the conduit B B' by pressure instead of exhaustion, the dampers $B^3$, $B^5$, and $B^6$ are opened and $B^4$ $B^7$ $B^8$ are closed. Then air will be taken in at $B^5$, and, in consequence of $B^4$ being closed, will by the action of the exhauster be forced through $B^3$, $B^{10}$, B, B', $B^2$, $B^6$, and $B^9$ to the drying-room, as before. We have thus the choice of using either of the two methods at pleasure. When it is desired to obtain access to the surface of the brick in the kiln A, Fig. 1, the conduit B B' is raised or lowered, the telescopic or slip joints O permitting such movement without breaking connection with the outer channels of communication. The deflector or covering-plate $k$ is also easily raised or lowered when necessary, being counterbalanced by the apparatus $k^2$. When it is desired to regulate the temperature of a current of air flowing through the conduit B B', the above-described means of adjusting a conduit and deflector, or either of them, as the case may be, renders such regulation of temperature easy, for by raising or otherwise rendering the deflectors inoperative the outer air will be to a certain extent commingled with and reduce the temperature of the hot gases, which effect will be still further heightened by raising the conduit, permitting such admixture to take place underneath the same. By this adjustment of either a conduit or its deflecting-plates, or both, it is easy to control the temperature of said conduit, and therefore of the current of air flowing therein.

Having thus described the invention, what I claim as new is—

1. In the manufacture of brick and other articles formed of clay, the combination, with a kiln, of an adjustable metallic conduit arranged and adapted to receive a current of air for the purpose of heating the same by heat from said kiln, a drying-room connected with said conduit, and an exhauster for impelling a current of air through said conduit to said drying-room, substantially as and for the purposes set forth.

2. In the manufacture of brick and other articles formed of clay, the combination, with a kiln, of a branched or multiple metallic conduit vertically adjustable, arranged and adapted to receive a current of air for the purpose of heating the same by heat from said kiln, a drying-room connected with said conduit, and an exhauster for impelling a current of air through said conduit to said drying-room, substantially as and for the purposes set forth.

3. In the manufacture of brick or other articles formed from clay, the combination, with the kiln, of a metallic conduit adjustable as to its position in relation to the hot bricks therein, an adjustable deflecting-plate adapted to cause the escaping hot gases of said kiln to impinge upon said conduit, and an exhauster arranged and adapted to impel a current of air through said conduit for the purpose of imparting to said air heat from the said hot gases, substantially as set forth.

4. In the manufacture of brick, the combination, with an open-top kiln, of an adjustable metallic conduit adapted to transmit waste heat from said kiln to a current of air within said conduit and permitting the free adjustment of said conduit as to its proximity to the hot bricks of said kiln without impairing the connection of said conduit with exterior channels, substantially as set forth.

5. In the manufacture of brick, the combination, with a kiln, of a metallic conduit heated by contact with the hot gases thereof and adjustable as to its position in relation to the hot bricks therein, an exhaust-fan connected by suitable channels with said conduit, and suitable valves or dampers arranged and adapted to so direct the course of a current of air actuated by said exhaust-fan that the said current shall flow through said heated conduit, either by pressure or exhaustion, at the will of the operator, substantially as and for the purposes set forth.

In testimony that I claim the foregoing I have hereunto set my hand this 18th day of January, 1888.

JAMES S. BALDWIN.

Witnesses:
CHARLES H. PELL,
OSCAR A. MICHEL.